(12) United States Patent
Pepin

(10) Patent No.: US 7,210,379 B1
(45) Date of Patent: May 1, 2007

(54) RIGGING TOOL

(76) Inventor: Aaron P. Pepin, 10818 Sagecanyon St., Houston, TX (US) 77089

( * ) Notice: Subject to any disclaimer, the term of this patent is extended or adjusted under 35 U.S.C. 154(b) by 116 days.

(21) Appl. No.: 11/073,023

(22) Filed: Mar. 7, 2005

(51) Int. Cl.
- *B25B 13/00* (2006.01)
- *B25B 17/00* (2006.01)
- *B25B 9/00* (2006.01)
- *B66F 3/00* (2006.01)

(52) U.S. Cl. .......................... 81/57.36; 81/13; 81/57.4; 254/100

(58) Field of Classification Search ............... 81/57.36, 81/13, 57.4, 57.46, 57.43; 254/100
See application file for complete search history.

(56) References Cited

U.S. PATENT DOCUMENTS

| | | | | |
|---|---|---|---|---|
| 716,633 A | * | 12/1902 | Hains et al. ................... 267/70 |
| 2,360,019 A | * | 10/1944 | Ryan et al. .................... 403/44 |
| 3,585,884 A | | 6/1971 | Leckle | |
| 3,751,083 A | * | 8/1973 | Jacobson et al. ............. 403/46 |
| 3,803,926 A | * | 4/1974 | Winter ........................ 74/89.3 |
| 4,100,875 A | * | 7/1978 | Patterson et al. ........... 114/251 |
| 4,130,269 A | * | 12/1978 | Schreyer ...................... 403/45 |
| 4,238,102 A | * | 12/1980 | Salter .......................... 248/543 |
| 4,408,927 A | * | 10/1983 | Fraiberg ...................... 403/320 |
| 4,487,094 A | * | 12/1984 | Wilkens et al. ............. 81/57.39 |
| 5,367,825 A | * | 11/1994 | Doring ......................... 49/199 |
| 5,730,541 A | | 3/1998 | Duett et al. | |
| 7,007,350 B1 | * | 3/2006 | Franke ...................... 24/136 R |

* cited by examiner

*Primary Examiner*—Lee D. Wilson
*Assistant Examiner*—Alvin J. Grant
(74) *Attorney, Agent, or Firm*—Egbert Law Offices

(57) ABSTRACT

A rigging tool for use with a turnbarrel for joining ends of cables together in which the rigging tool has a first gripping member with a receptacle suitable for receiving a terminal end of a cable therein, a second gripping member having a receptacle suitable for receiving a terminal end of another cable therein, and a translating rod assembly connected to the first and second gripping members for allowing the gripping members to translate with respect to each other when the turnbarrel is rotated. The translating rod has a tubular body with a first rod fixedly adjustably received in one end of the tubular body and a second rod resiliently mounted in the second end of the tubular body.

16 Claims, 3 Drawing Sheets

RIGGING TOOL

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to cable rigging tools. More particularly, the present invention relates to tools that facilitate the ability to establish a desired tension with respect to a pair of cables. More particularly, the present invention relates to rigging tools for use with aircraft cables whereby the ends of the cables are joined together and can be set to desired tension with a minimum amount of difficulty.

BACKGROUND OF THE INVENTION

High-stress turnbuckles for adjusting the tension of control cables, especially cables in aircraft which are located in somewhat inaccessible and remote places, usually comprising three parts consisting of an elongated central, somewhat cylindrical, part or barrel having an aperture or small hole extending therethrough transverse to its longitudinal axis and used to receive a "safety" wire connecting the threaded adjustable ends of the turnbuckle to prevent any material rotative movement between the central portion and the oppositely threaded ends to which the control cable members between the "actuating" means and the "actuated" parts are connected. The opposite ends of the central, or barrel portion, taper outwardly in opposite directions and are internally and reversely threaded and receive the right- and left-hand threaded adjustment stems or screws to which the control element manipulating cables are attached.

The cable adjustment stems or screws are each preferably formed with a "hex" or "end wrench" receiving portion located adjacent the outer ends of the threaded portions. The turnbuckles can be extended or contracted to control the cable tension by relative rotation of either one or both of the stems or screws while holding the elongated central portion against rotation, or the central barrel portion can be rotated on the right- and/or left-hand threaded stem portions if the threaded stems are held against rotation. The conventional or common method for adjusting the cable tensions has been to remove the "safety" wire and insert an elongated pin, nail, or rod in the transverse "safety wire" receiving hole in the central or barrel portion and apply an "end" wrench to the "hex" portions of the threaded stems to hold the stems against rotation while the central portion is rotated by swinging the pin or nail. Of course, the intermediate barrel portion can be held against rotation by the pin, rod or nail through the safety wire hole while an end wrench is applied to the "hex" portions on the stems to screw the end portions in or out of the central or barrel portion, to tension or slack the connected cables, although this could twist the cables.

The conventional use of a nail, drill bit, pin, or rod in the hole in the central portion of the turnbuckle for holding or rotating the same to cause extension or contraction presents considerable difficulties and is objectionable, especially where the turnbuckles are located in somewhat confined, dark and inaccessible places. It is difficult, in the first place, to manipulate and insert the holding pins or rods, and further to retain the pins in place during the adjustments. The pins, etc. are loose and very often drop out when released by the adjuster, often dropping down, especially inside of aircraft structures, where they cannot be retrieved, often presenting a possibility of jamming, or damage to electrical wiring and other adjacent parts or devices, and may even cause a serious malfunction of the aircraft or its equipment. At least two hands are required to hold the pin in place and manipulate the end wrench and the central barrel portion. If the pin, nail or rod is momentarily released, it can and often does drop out, causing much time delay and inconvenience before another suitable pin, nail or rod can be found and inserted. In dark "out of the way" places, where the cable adjusting turnbuckles cannot be easily seen, the location of the safety wire hole and its direction, and the insertion of a "holding" pin therein can also be difficult and time consuming.

Various U.S. patents have issued in the past relating to such rigging tools. For example, U.S. Pat. No. 3,585,884, issued on Jun. 22, 1971 to L. L. Leckle, describes an aircraft turnbuckle cable adjustment device or speed wrench which is removably interlocked on a turnbuckle intermediate the ends thereof and surrounds the central portion thereof. The device is easily manipulatable manually to control and adjust the tension of the cables which are connected or secured to or in the opposite ends of the turnbuckle. A circular or disk-like member having a turnbuckle-receiving slot extends inwardly from the periphery to its center to receive and locate the central or barrel portion of a turnbuckle substantially concentrically within the device. A holding pin is fixed on the inner end of the slot to project radially outwardly intermediate the sides of the slot for insertion into the safety wire receiving hole in the intermediate or barrel portion of the turnbuckle. A locking or retaining plate is pivoted in a slot in the body for swinging movement across the turnbuckle-receiving access and against a turnbuckle. A setscrew is provided in the body for engaging and holding the pivoted retaining plate in its locking position in front of the turnbuckle.

U.S. Pat. No. 5,730,541, issued on Mar. 24, 1998 to Duett et al., describes a turnbuckle driver in which a main mount having a central hub is secured to a turnbuckle. A ring gear surrounds the hub. A motionless bearing fits over the hub and is held in place with a locking ring. The motionless bearing includes several bores that receive a driving bit that engages the ring gear. As the driving bit is rotated, the main mount is rotated about the motionless bearing thereby tightening or loosening the turnbuckle.

U.S. Pat. No. 4,487,094, issued on Dec. 11, 1984 to Wilkens et al., teaches a turnbuckle ratchet tightening tool which is used in rapidly tightening and loosening barge turnbuckles used with lashing lines to lash a plurality of barges together. The tool has an extendable overcenter lock holder that fits over the turnbuckle that is resting on roller supports. The turnbuckle carrier body is free to rotate. A foot-operated lever is ratchet connected to an enlarged actuator whose teeth engage the teeth on the turnbuckle carrier body. In this manner, downward movement of the foot-operated lever rotates the actuator which, in turn, rotates the turnbuckle carrier body in its holder.

It is an object of the present invention to provide a rigging tool that effectively allows for the tensioning of a pair of cables together.

It is another object of the present invention to provide a rigging tool whereby the rigging operation can be accomplished with a one-handed operation.

It is another object of the present invention to provide a rigging apparatus which is non-marring to the surfaces of the turnbarrel or the terminal ends of the cables.

It is still another object of the present invention to provide a rigging apparatus whereby the terminal ends of the cables can be securely maintained in place while the turnbarrel serves to tighten or loosen the ends of the cables.

It is a further object of the present invention to provide a rigging tool which minimizes the amount of time and labor associated with setting the desired tension on aircraft cables.

It is still another object of the present invention to provide a rigging apparatus which easy to use, easy to manufacture, relatively inexpensive, and highly effective.

These and other objects and advantages of the present invention will become apparent from a reading of the attached specification and appended claims.

BRIEF SUMMARY OF THE INVENTION

The present invention is a rigging tool for use with a turnbarrel for joining ends of cables together. This rigging tool includes a first gripping member having a receptacle suitable for receiving a terminal end of a cable therein, a second gripping member having a receptacle suitable for receiving a terminal end of another cable therein, and a translating means connected to the gripping members for allowing the first and second gripping members to translate with respect to each other when the turnbarrel is rotated.

In the present invention, the translating means includes a tubular body having a first end and a second end. A first rod is fixedly adjustably received at the first end of the tubular body. A second rod is resiliently mounted in the second end of the tubular body. A spring is mounted within the tubular body so as to have an end bearing against the second rod. The second rod is slidably received within the tubular body. An adjustment arm affixed to the tubular body. This adjustment arm has a pin extending from a surface thereof. The first rod has a plurality of detents formed on a surface thereof. The adjustment arm movable between a first position in which the pin engages one of the plurality of detents and a second position in which said pin is spaced from the plurality of detents. The first rod is affixed to the first gripping member at an end extending outwardly of the tubular body. The second rod is affixed to the second gripping member at an end extending outwardly of the tubular body. In the preferred embodiment of the present invention, the tubular body is a square tubular member. Each of said first and second rods are also of a square tubular configuration so as to be slidably received within the square tubular body.

The first gripping member includes a first arm affixed to one end of the translating means and a gripper formed at an end of the first arm opposite the translating means. The gripper has a slot formed therein suitable for receiving the terminal end of the cable therein. The slot of the gripper has a pair of parallel flat sides in spaced relation to each other in an interior of the gripper. The slot also has a curved surface formed at an end of the pair of parallel flat sides in the interior of the gripper. In the preferred embodiment of the present invention, the gripper has a plurality of slots formed therein in stacked relation. A lowermost slot of the plurality of slots has a narrower width than a width of an uppermost slot of the plurality of slots. The second gripping member includes a second arm affixed to an opposite end of the translating means and a gripper formed at an end of the second arm opposite the translating means. The slot of the gripper of the second arm is aligned with the slot of the gripper of the first arm.

As used in the present invention, a turnbarrel has a first cable interconnected at one end of the turnbarrel and a second cable interconnected to an opposite end of the turnbarrel. The turnbarrel being rotatable so as to draw the first and second cables away from or toward each other. The first gripping member has a slot releasably receiving the first cable therein. The second gripping member has a slot releasably receiving the second cable therein.

In particular, the terminal end of the first cable has an engagement surface formed thereover. The slot of the first gripping member receives this engagement surface therein. Similarly, the terminal end of the second cable has an engagement surface formed thereover. The slot of the second gripping member receives the engagement surface of the second cable therein. In particular, the engagement surface has a pair of flats formed in parallel relationship to each other and an annular portion suitably extending outwardly of the pair of flats at one end of the pair of flats. As such, the curved surface of each of the slots of the first and second gripping members slidably receives the annular portion of the engagement surface of the respective first and second cables.

The present invention further includes a suitable adjustment means removably received so as to rotate the turnbarrel. This adjustment means has a body with a slot extending radially thereinto. This slot will have a width greater than a diameter of the turnbarrel. A pin is affixed to the body and extends through the slot. The pin is slidably receivable within a hole in the turnbarrel. A clip is affixed to the body and extends on opposite sides of the pin and adjacent walls of the slot. The clip has a first side resiliently spaced from a second side thereof by a distance less than a diameter of the turnbarrel. As such, the adjustment tool can rotate the turnbarrel with a one-handed operation.

BRIEF DESCRIPTION OF THE SEVERAL
VIEWS OF THE DRAWINGS

DETAILED DESCRIPTION OF THE
INVENTION

Figure 1:
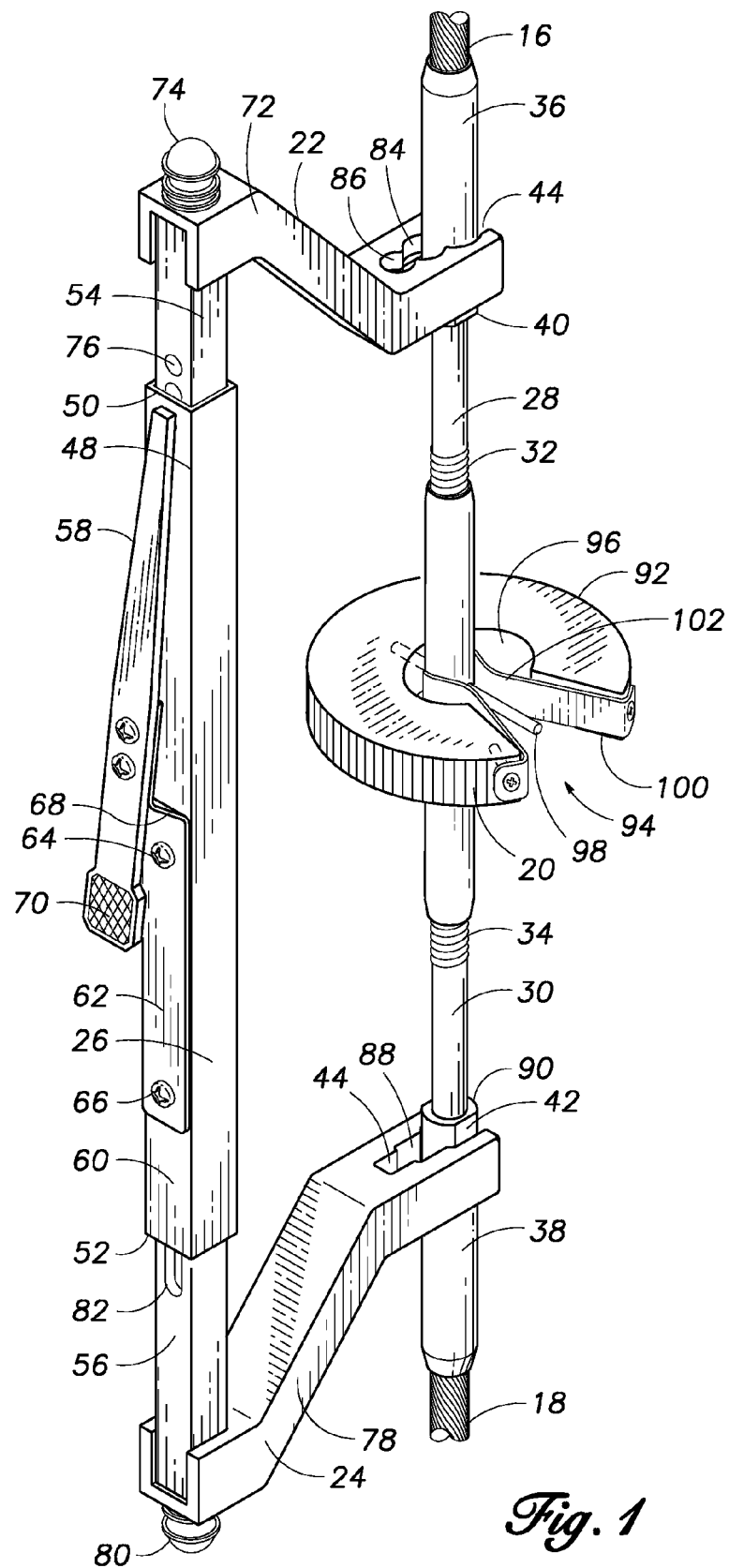
FIG. 1 is a perspective view showing the rigging apparatus in accordance with the preferred embodiment of the present invention.

Referring to FIG. 1, there is shown the rigging apparatus 10 in accordance with the preferred embodiment of the present invention. The rigging apparatus 10 includes a rigging tool 12 that is particularly configured for use with a turnbarrel 14 associated with joining ends of cables 16 and 18 together. In particular, an adjustment tool 20 is provided for setting a desired tension in the cables 16 and 18. The rigging tool 12 includes a first gripping member 22, a second gripping member 24 and a translating means 26. The translating means 26 is in the form of a translatable rod that is connected, at opposite ends, to the respective gripping members 22 and 24.

In FIG. 1, it can be seen that the turnbarrel 14 is interconnected to the cables 16 and 18 at the respective terminal ends 28 and 30 thereof. As can be seen, the terminal end 28 has a threaded portion 32 which is engagable within a threaded end of the turnbarrel 14. The terminal end 30 also has a threaded portion 34 which is also threadedly received within the opposite end of the turnbarrel 14. The ends of the turnbarrel 14 are suitably threaded such that a rotation of the turnbarrel 14 will cause the threaded portions 32 and 34 of the terminal ends 28 and 30 to be either drawn into or drawn away from each other. This is accomplished by using opposing threads at the opposite ends of the turnbarrel 14.

In particular, the first cable 16 can be swaged within a connector 36. Similarly, the second cable 18 can be swaged within a connector 38. The connector 36 has an engagement surface 40 formed thereon and extending outwardly therefrom. Similarly, the connector 38 has an engagement surface 42 formed thereon. The terminal ends 28 and 30 are respectively affixed to the connectors 36 and 38 by conventional means, such as threading, welding, fastening, or other means. It can be seen that the first gripping member 22 has a receptacle 44 which receives the engagement surface 40 of the connector 36. Similarly, the second gripping member 24 has a receptacle 46 which receives the engagement surface 42 associated with connector 38.

The translating means 26 is particularly configured for use with the gripping members 22 and 24 of the present invention. The translating means 26 includes a tubular body 48 having a first end 50 and second end 52. A first rod 54 is fixed adjustably received within the first end 50 of the tubular body 48. A second rod 56 is resiliently mounted in the second end 52 of the tubular body 48. An adjustment arm 58 is supported on surface 60 of the tubular body 48 by a leaf spring arrangement 62. A pair of screws or bolts 64 and 66 secure the leaf spring 62 to the surface 60 of the tubular body 48. A resilient portion 68 extends outwardly so as to support the adjustment arm 58 in a desired relationship with respect to the surface 60. The adjustment arm 58 has a knurled surface 70 at one end thereof. As a result, by placing firm pressure on the knurled surface 70, the adjustment arm 58 can be moved inwardly or outwardly with respect to surface 60 of the tubular body 48.

The first rod 54 has a portion that extends outwardly of the end 50 of the tubular body 48. The first gripping member 22 has an arm 72 which is affixed by threaded members 74 to the end of the first rod 54. The first rod 54 also has a plurality of detents 76 formed on a surface thereof. This surface is adjacent to the surface 60 of the tubular body 48. As will be described hereinafter, the adjustment arm 58 will have a pin the extends through an opening in the surface 60 so as to engage one of the plurality of detents 76 formed on the surface of the rod 54. As a result, the position of the arm 72 can be set as desired. If it is intended to adjust the positioning of the first rod 54, a pressure can be applied to the knurled surface 70 of the adjustment arm 58 so as to allow a different detent 76 to be engaged with the pin from the adjustment arm 58. The leaf spring 62 serves to urge the adjustment arm 58 such that the pin is engaged with one of the detents 76.

The second arm also extends outwardly from the end 52 of the tubular body 48. The second gripping member 24 includes an arm 78 that has a lower end affixed to the end of the second rod 56 by a threaded member 80. As such, the arm 78 can extend outwardly of the tubular body 48. A slot 82 is formed in a surface of the second rod 56 adjacent to the surface 60 of the tubular body 48. As a result, the second rod 56 can be slidably resiliently mounted within the interior of the tubular body 48.

The first arm 72 has receptacle 44 at the end thereof opposite the first rod 54. The receptacle 44 includes a plurality of slots 84 formed therein. As can be seen in FIG. 1, each of the slots 84 has a generally curved surface opening to the side 86 of the arm 72. The curved surface of slots 84 will allow the annular portion of the engagement surface 40 of connector 36 to be slidably received therein. The second arm 78 has the receptacle 46 formed at an end opposite the tubular body 48. Receptacle 46 is illustrated as having slots 88 formed therein. Slots 88 each have a pair of parallel flat sides that face each other. These flat sides will accommodate the pair of flats 90 formed on the engagement surface 42 associated with connector 38. The relationship between the pair of parallel flat sides 88 and the pair of flats 90 of the connector 38 securely retain the connector 38 within the receptacle 46 so as to allow rotation to be achieved on the turnbarrel 14 without rotation occurring on the connector 38. A similar arrangement applies with respect to the first gripping member 22 and its associated connector 36 of cable 16.

FIG. 1 illustrates the use of the adjustment mechanism 20. The adjustment mechanism 20 is illustrated in the form of discoidal body 92 having a slot 94 extending radially thereinto. A central aperture 96 is formed interior of the discoidal body 92. A pin 98 is affixed to the discoidal body 92 and extends radially outwardly through the slot 94. A spring clip 100 is affixed to the periphery of the discoidal body 92 so as to extend into the slot 94. The clip 100 will have a narrow area 102 in which the sides of the clip 100 are spaced by a distance less than a diameter of the turnbarrel 14.

So as to adjust the tension on the cables 16 and 18, the adjustment tool 20 is placed so that the pin 98 extends through a hole formed axially through the turnbarrel 14. The clip 100 will loosely reside around the turnbarrel 14 so as to prevent the release of the tool 20 during the rotation of the discoidal body 92. The periphery of the discoidal body 92 can be gripped by a human hand so as to rotate the turnbarrel 14 in one direction or another so as to adjust the tension of the cables 16 and 18. After a desired tension has been achieved, the pin 98 can be slidably removed from the hole in the turnbarrel 14. Similarly, the rigging tool 12 can be pulled outwardly from the connectors 36 and 38 of the respective cables 16 and 18. The configuration, of the receptacles 44 and 46 associated with the first gripping member and the second gripping member, respectively, allows translatable motion to occur between the connectors 36 and 38 of the respective cables 16 and 18.

Figure 2:
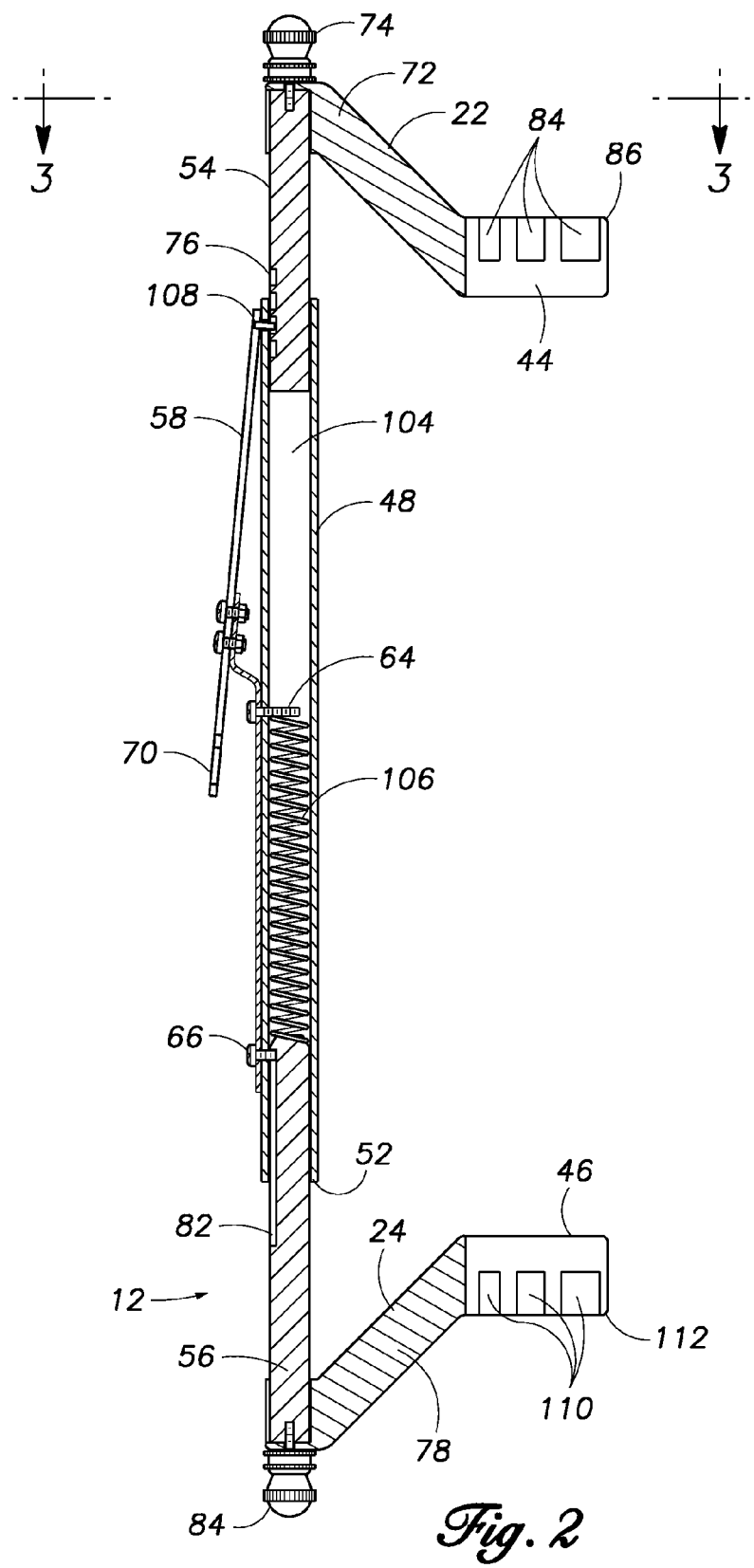
FIG. 2 is a cross-sectional view of the rigging tool of the preferred embodiment of the present invention.

FIG. 2 illustrates the interior operation of the rigging tool 12 of the present invention. As can be seen, the tubular body 48 is of a square tubular configuration. Similarly, the first rod 54 and the second rod 56 are also of a square tubular configuration. Each of the rods 54 and 56 are slidably received within the interior 104 of the tubular body 48. It can be seen that a spring 106 is received within the interior 104 of the tubular body 48. Screw 64 extends into the interior 104 so as to provide a backstop against one end of the spring 106. The opposite end of the spring 106 will bear against the interior end of the first rod 54 so as to exert a resilient force urging the second rod 56 outwardly therefrom. The screw 66 will serve as a stop to the movement of the second rod 56 outwardly of the ends 52 of the tubular body 48. In other words, the screw 66 will extend inwardly into the interior 104 of the tubular body 48 so as to be received within the slot 82 of the second rod 56. This serves to limit the outward movement of the rod 56.

The adjustment arm 58 is illustrated as having pin 108 extending through the wall of the tubular body 48 so as to engage one of the plurality of detents 76 formed on the wall of the first rod 54. As a result, the first rod 54 can be adjustably fixedly received within the interior 104 of the tubular body 48 such that a desired position of the first gripping member 22 can be appropriately set. When it is desired to reposition the first rod 54, a pressure can be applied to the knurled surface 70 of the adjustment arm 56 so as to lift the pin 108 from the detent and to allow the rod 54 to be suitably repositioned. When the knurled surface 70 is released, the pin 108 will be urged back so as to engage one of the plurality of detents 76.

In FIG. 2, it can be seen that threaded member 74 serves to secure the first arm 72 to the end of the first rod 54. Similarly, the threaded member 80 secures the end of the second arm 78 to the end of the second rod 56.

Importantly, in FIG. 2, it can be seen that the receptacle area 44 of the first gripping member 22 has curved surfaces 84 extending outwardly of side 86. It can be seen that each of the curved surfaces 84 has different size so as to accommodate different sizes of engagement surfaces associated with connector 36. The curved surfaces 84 are of different diameters arranged in a stacked configuration so that the narrowest diameter is nearer the tubular body 48 than is the wider diameter curved surface. A similar arrangement is provided for the receptacle 46 associated with the second gripping member 24. It can be seen that each of the curved surfaces 110 will open to the side 112 of the receptacle 46. As a result of this arrangement, the annular portion of the connectors 10 translate relative to any motion imparted by the rotation of the turnbarrel 14.

Figure 3:
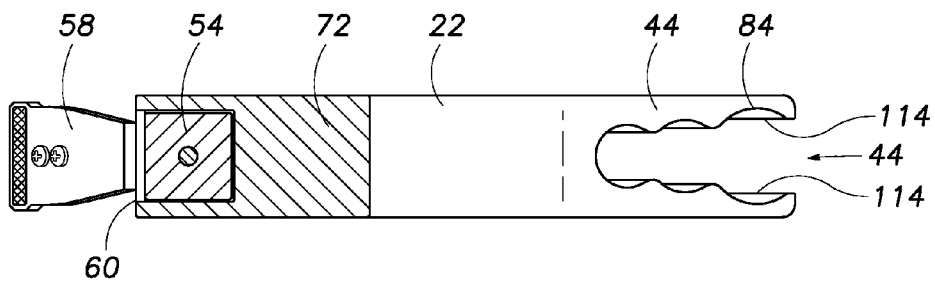
FIG. 3 is cross-sectional view as taken across lines 3—3 of FIG. 2.

FIG. 3 shows the cross-sectional view generally adjacent to the first gripping member 22. It should be noted that the second gripping member 24 will have a similar configuration when viewed at an opposite angle. As can be seen, the receptacle 44 includes pair of parallel flat sides 114 positioned at the end of the respective curved surfaces 84. The distances between the flat surfaces 114 will be less corresponding to each of the slots formed in the receptacle 44. In FIG. 3, it can be seen that the first gripping member 22 has arm 72 affixed to the end of the first rod 54. The adjustment arm 58 extends outwardly of the surface 60 of the tubular body 48.

Figure 4:
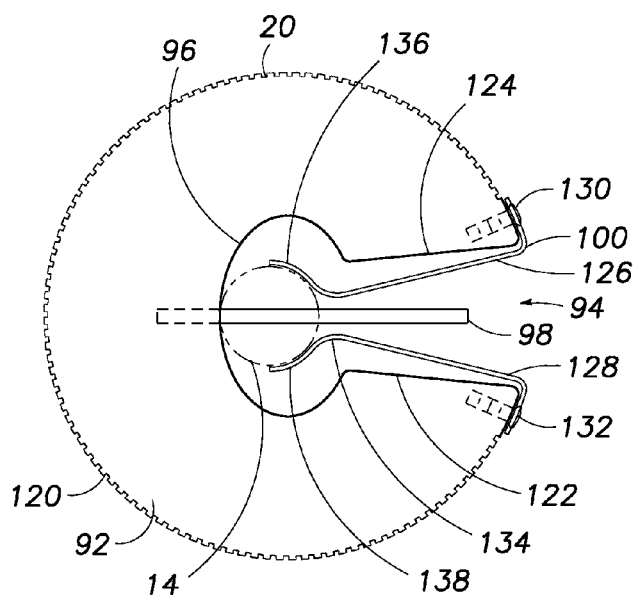
FIG. 4 is a side elevational view of the adjustment tool as used with the rigging apparatus of the present invention.

FIG. 4 is an illustration of the adjustment tool 20 as used in the present invention. The adjustment tool 20 has discoidal body 92 with a knurled (or convoluted) outer periphery 120. The slot 94 is illustrated as extending radially through the interior of the discoidal body 92 so as to open at the central aperture 96. Pin 98 has one end affixed within the discoidal body 92 and an opposite end extending outwardly into the slot 94. As can be seen in FIG. 4, the pin 94 is generally equally spaced between each of the sides 122 and 124 of the slot 94. The clip 100 has a side 126 and a side 128. These sides 126 and 128 extend resiliently into the slot 94 on opposite sides of the pin 94 and generally adjacent to the sides 122 and 124 of the slot 94. Suitable fasteners 130 and 132 serve to secure the sides 126 and 128, respectively, onto the outer periphery 120 of discoidal body 92.

These sides 126 and 128 of the clip 100 define a throat area 134. This throat area has a narrower distance between the sides 126 and 128 than the diameter of the turnbarrel 14. Curves surfaces 136 and 138 lightly bear against the periphery of the turnbarrel 14. The pin 98 is illustrated as extending through the axial hole formed through the turnbarrel 14. Through this arrangement, the turnbarrel 14 can be easily rotated by a turning motion applied, by one hand, onto the outer periphery 120 of the discoidal body 92. The sides 126 and 128 of clip 100 will deflect outwardly when the adjustment tool 20 is removed from the turnbarrel 14. The adjustment tool 20 can be removed from the turnbarrel 14 in a one-handed operation. The turnbarrel 14 can be rotated in the manner described hereinabove without any marring occurring to the surfaces of the turnbarrel 14.

Figure 5:
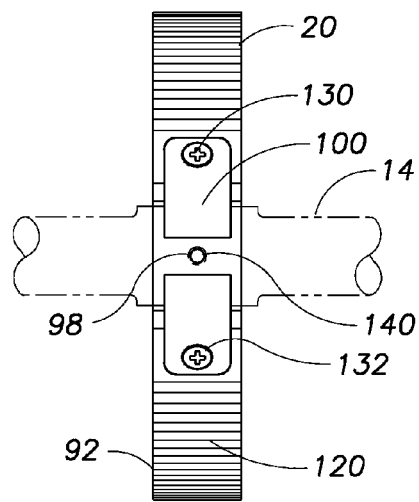
FIG. 5 is an end view showing the adjustment tool as used with the rigging apparatus of the present invention.

FIG. 5 illustrates how the adjustment tool 20 is secured around the turnbarrel 14. In particular, the clip 100 is secured by fasteners 130 and 132 to the outer periphery 120 of the discoidal body 92 of the adjustment tool 20. The pin 98 is illustrated as extending through the hole 140 formed through the turnbarrel 14. The hole 140 extends transverse to the longitudinal axis of the turnbarrel 14.

The foregoing disclosure and description of the invention is illustrative and explanatory thereof. Various changes in the details of the illustrated configuration can be made within the scope of the appended claims without departing from the true spirit of the invention. The present invention should only be limited by the following claims and their legal equivalents.

I claim:

1. A rigging tool for use with a turnbarrel for joining ends of cables together, the rigging tool comprising:
    a first gripping member having a receptacle suitable for receiving a terminal end of a cable therein; and
    a second gripping member having a receptacle suitable for receiving a terminal end of another cable therein; and
    a translating means connected to said first and second gripping members for allowing said first and second gripping members to translate with respect to each other when the turnbarrel is rotated, said first gripping member comprising:
        a first arm affixed to one end of said translating means; and
        a gripper formed at an end of said first arm opposite said translating means, said gripper having a slot formed therein suitable for receiving the terminal end of the cable therein, said gripper having a plurality of slots formed therein in stacked relation, a lowermost slot of said plurality of slots having a narrower width than a width of an uppermost slot of said plurality of slots.

2. The rigging tool of claim 1, said translating means comprising:
    a tubular body having a first end and a second end;
    a first rod adjustably received in said first end of said tubular body; and
    a second rod resiliently mounted in said second end of said tubular body.

3. The rigging tool of claim 2, said translating means further comprising:
    a spring mounted within said tubular body so as to have an end bearing against said second rod, said second rod being slidably received in said tubular body.

4. The rigging tool of claim 2, said translating means further comprising:
    an adjustment arm affixed to said tubular body, said adjustment arm having a pin extending from an end thereof, said first rod having a plurality of detents formed on a surface thereof, said adjustment arm movable between a first position in which pin engages one of said plurality of detents and a second position in which said pin is spaced from said plurality of detents.

5. The rigging tool of claim 2, said first rod being affixed to said first gripping member at an end extending outwardly of said tubular body, said second rod affixed to said second gripping member at an end extending outwardly of said tubular body.

6. The rigging tool of claim 2, said tubular body being of a square tubular member, each of said first and second rods being square tubular members slidably received within said tubular body.

7. The rigging tool of claim 1, said slot of said gripper having a pair of parallel flat sides in spaced relation to each other in an interior of said gripper, said slot having a curved surface formed at and end of said pair of parallel flat sides in said interior of said gripper.

8. The rigging tool of claim 1, said second gripping member comprising:
   a second arm affixed to an opposite end of said translating means; and
   a gripper formed at an end of said second arm opposite said translating means, said gripper of said second gripping member having a slot formed therein suitable for receiving the terminal end of another cable therein, said slot of said gripper of said second arm being aligned with said slot of said gripping member of said first arm.

9. A rigging apparatus comprising:
   a turnbarrel;
   a first cable having a terminal end interconnected to one end of said turnbarrel;
   a second cable having a terminal end interconnected into an opposite end of said turnbarrel, said turnbarrel being rotatable so as to draw said first and second cables toward or away from each other;
   a first gripping member having a slot releasably receiving said first cable therein;
   a second gripping member having a slot releasably receiving said second cable therein; and
   a translating means connected to said first and second gripping members for allowing said first and second gripping members to translate with respect to each other when said turnbarrel is rotated, said terminal end of said first cable having an engagement surface formed thereover, said slot of said first gripping member receiving said engagement surface therein, said terminal end of said second cable having an engagement surface formed thereover, said slot of said second gripping member receiving said engagement surface of said second cable therein, said engagement surface of each of said first and second cables having a pair of flats formed in parallel relation to each other and an annular portion extending outwardly of said pair of flats at one end of said pair of flats.

10. The apparatus of claim 9, said slot of each of said first and second gripping members having a pair of parallel flat sides in spaced relationship to each other, said pair of parallel flat sides receiving said pair of flats therewithin and thereagainst, said slot of each of said first and second gripping member having a curved surface formed at an end of said pair of parallel flat sides, said curved surface slidably receiving said annular portion therein.

11. A rigging apparatus comprising:
   a turnbarrel;
   a first cable having a terminal end interconnected to one end of said turnbarrel;
   a second cable having a terminal end interconnected into an opposite end of said turnbarrel, said turnbarrel being rotatable so as to draw said first and second cables toward or away from each other;
   a first gripping member having a slot releasably receiving said first cable therein;
   a second gripping member having a slot releasably receiving said second cable therein; and
   a translating means connected to said first and second gripping members for allowing said first and second gripping members to translate with respect to each other when said turnbarrel is rotated, each of said first and second gripping members having a plurality of slots formed therein in stacked relationship to each other, a lowermost slot of said plurality of slots having a narrower width than a width of an uppermost slot of said plurality of slots.

12. The apparatus of claim 11, said translating means comprising:
   a tubular body having a first end and a second end;
   a first rod adjustably received in said first end of said tubular body; and
   a second rod resiliently mounted in said second end of said tubular body.

13. The apparatus of claim 12, said translating means further comprising:
   a spring mounted within said tubular body so as to have an end bearing against said second rod, said second rod being slidably received in said tubular body; and
   an adjustment arm affixed to said tubular body, said adjustment arm having a pin extending therefrom, said first rod having a plurality of detents formed on a surface thereof, said adjustment arm movable between a first position in which pin engages one of said plurality of detents and a second position in which said pin is spaced from said plurality of detents.

14. The apparatus of claim 11, further comprising:
   an adjustment means removably received for rotating said turnbarrel.

15. The apparatus of claim 14, said turnbarrel having a hole extending axially therethrough in a direction transverse to a longitudinal axis of said turnbarrel, said adjustment means comprising:
   a body having a slot extending radially thereinto, said slot having a width greater than a diameter than said turnbarrel; and
   a pin affixed to said body and extending through said slot, said pin slidably receivable in said hole of said turnbarrel.

16. The apparatus of claim 15, said adjustment means further comprising:
   a clip affixed to said body and extending on opposite sides of said pin and adjacent walls of said slot, said clip having a first side and a second side resiliently spaced from each other in an area adjacent said turnbarrel by a distance less than a diameter of said turnbarrel.

* * * * *